US008577518B2

(12) United States Patent
Linden et al.

(10) Patent No.: US 8,577,518 B2
(45) Date of Patent: Nov. 5, 2013

(54) AIRBORNE RIGHT OF WAY AUTONOMOUS IMAGER

(75) Inventors: David Linden, Dexter, MI (US); David William Yoel, Radnor, PA (US)

(73) Assignee: American Aerospace Advisors, Inc., Radnor, PA (US)

( * ) Notice: Subject to any disclaimer, the term of this patent is extended or adjusted under 35 U.S.C. 154(b) by 407 days.

(21) Appl. No.: 12/787,734

(22) Filed: May 26, 2010

(65) Prior Publication Data

US 2010/0305782 A1 Dec. 2, 2010

Related U.S. Application Data

(60) Provisional application No. 61/217,106, filed on May 27, 2009.

(51) Int. Cl.
*G06F 19/00* (2011.01)
*G01C 23/00* (2006.01)

(52) U.S. Cl.
USPC .............................. 701/3; 396/419; 348/144

(58) Field of Classification Search
None
See application file for complete search history.

(56) References Cited

U.S. PATENT DOCUMENTS

| | | | | |
|---|---|---|---|---|
| 3,589,257 A * | 6/1971 | Horiuchi | 396/329 |
| 4,700,307 A * | 10/1987 | Mons et al. | 701/446 |
| 4,994,681 A * | 2/1991 | Mann | 250/559.3 |
| 5,045,937 A * | 9/1991 | Myrick | 348/144 |
| 5,304,806 A * | 4/1994 | Hines et al. | 250/369 |
| 5,465,142 A * | 11/1995 | Krumes et al. | 356/5.01 |
| 5,596,494 A * | 1/1997 | Kuo | 702/2 |
| 5,640,619 A * | 6/1997 | Takayama et al. | 396/137 |
| 5,894,323 A * | 4/1999 | Kain et al. | 348/116 |
| 5,897,223 A * | 4/1999 | Tritchew et al. | 396/13 |
| 5,943,476 A * | 8/1999 | Dougherty et al. | 700/259 |
| 6,195,122 B1 * | 2/2001 | Vincent | 348/169 |
| 6,243,483 B1 | 6/2001 | Petrou et al. | |
| 6,419,582 B1 * | 7/2002 | Goden et al. | 463/33 |
| 6,574,361 B1 * | 6/2003 | Kawakami et al. | 382/154 |
| 6,766,226 B2 * | 7/2004 | Andersen | 701/3 |
| 6,906,643 B2 * | 6/2005 | Samadani et al. | 340/995.18 |
| 7,184,072 B1 * | 2/2007 | Loewen et al. | 348/144 |
| 8,000,867 B2 * | 8/2011 | Lee | 701/58 |
| 2003/0231190 A1 * | 12/2003 | Jawerth et al. | 345/660 |

(Continued)

FOREIGN PATENT DOCUMENTS

JP 10210457 8/1998

OTHER PUBLICATIONS

Belshaw et al., A High Speed Iterative Closest Point Tracker on an FPGA Platform, 2009.*
Besl et al., A Method of Registration of 3D Shapes, Feb. 1992.*

(Continued)

*Primary Examiner* — Fadey Jabr
*Assistant Examiner* — Krishnan Ramesh
(74) *Attorney, Agent, or Firm* — Ober, Kaler, Grimes & Shriver; Royal W. Craig

(57) ABSTRACT

An automated airborne video recording system for imaging pipeline or electric line rights-of-way, irrigation canals, or any other linear ground features. The system includes a gimbaled, stabilized camera system, a data recorder, and autonomous imager software that computes the shortest vector between the aircraft position and the pipeline based on the aircraft GPS and the Geographic Information Database. The system then commands the stabilized camera system to point directly at the pipeline regardless of the aircraft position and orientation, automatically collecting continuous NTSC or digital video of the entire right of way.

19 Claims, 3 Drawing Sheets

(56) References Cited

U.S. PATENT DOCUMENTS

| | | |
|---|---|---|
| 2004/0204838 A1* | 10/2004 | Chen et al. ............... 701/209 |
| 2005/0007450 A1* | 1/2005 | Hill et al. ................ 348/142 |
| 2005/0238220 A1* | 10/2005 | Guerra Llamas et al. .... 382/141 |
| 2006/0227134 A1* | 10/2006 | Khan et al. ............... 345/420 |
| 2006/0239509 A1* | 10/2006 | Saito ..................... 382/104 |
| 2007/0061076 A1* | 3/2007 | Shulman .................. 701/213 |
| 2007/0155492 A1* | 7/2007 | Goden et al. .............. 463/32 |
| 2007/0177011 A1* | 8/2007 | Lewin et al. .............. 348/118 |
| 2007/0299338 A1* | 12/2007 | Stevick et al. ............ 600/425 |
| 2008/0002031 A1* | 1/2008 | Cana et al. ............... 348/208.14 |
| 2010/0305782 A1* | 12/2010 | Linden et al. ............. 701/3 |
| 2011/0184647 A1* | 7/2011 | Yoel et al. ............... 701/301 |

OTHER PUBLICATIONS

F. Rafi et al., Autonomous target following by unmanned aerial vehicles, SPIE Defence and Security Symposium 2006, Orlando, FL.

* cited by examiner

AIRBORNE RIGHT OF WAY AUTONOMOUS IMAGER

CROSS-REFERENCE TO RELATED APPLICATION(S)

The present application derives priority from U.S. provisional application Ser. No. 61/217,106 filed 27 May 2009.

BACKGROUND OF THE INVENTION (1) Field of the Invention

The present invention relates to airborne imaging systems and, more particularly, to an automated airborne video recording system for imaging pipeline and electric line rights-of-way, or any other linear ground features.

(2) Description of Prior Art

Federal regulation requires that pipeline operators monitor their right of ways in an effort to prevent accidental damage to the pipeline and to detect leaks. As a result, major oil and natural gas pipeline companies each regularly monitor hundreds of thousands of miles of pipeline in the continental United States, and more on a multi-national scale. This is no small task. Conventional monitoring entails flying pilot/observers in light aircraft over the pipeline. The routine occurs usually at two week intervals. The aircraft flies at low altitude (500 ft to 1000 ft) and the pilot/observer visually inspects the right of way. Although this is a cost effective method of monitoring, it is not the most efficient. Advances in video and software technologies provide a good foundation for automation in this field. Indeed, this is beginning to occur.

Aerial video surveying of pipelines, electric lines, telecom corridors, railways, roadways and other linear ground features such as canals is already a viable option to visual surveying. U.S. Patent Application No. 2005023824 by Llamas et al. shows the automatic capture of detailed survey images using gimbaled cameras to aim at a linear infrastructure in an automatic way. It does this on the basis of 3D spatial position of a facility to be inspected.

F. Rafi et al. "Autonomous Target Following by Unmanned Aerial Vehicles", SPIE Defense and Security Symposium 406, Orlando Fla. describes an function for the autonomous navigation of an unmanned aerial vehicle (UAV) in which the aircraft visually tracks the target using a mounted camera. The camera is controlled by the function according to the position and orientation of the aircraft and the position of the target.

U.S. Pat. No. 5,596,494 to Kuo issued Jan. 21, 1997 shows a method and apparatus for acquiring digital maps, wherein images of terrestrial scenes and the absolute geophysical coordinates (Latitude and Longitude) of ground objects are acquired simultaneously by an aircraft.

Japan Publication number JP10210457 by Nakagawa Masahiro (Mitsubishi Electric Corp) published 1998 Aug. 7 shows a system for directing a camera to automatically photograph and record from an aircraft without operation by an operator by previously inputting the photographing position. An arithmetic unit calculates the direction of a gimbal stand, based on position, azimuth, and photographing position coordinates.

U.S. Pat. No. 6,195,122 to Vincent issued Feb. 27, 2001 shows an image system that captures, along with the images, information defining both the position and the orientation of a camera along with the distance to the subject.

U.S. Pat. No. 4,700,307 to Mons et al. issued Oct. 13, 1987 (General Dynamics) shows a method of navigating an airborne vehicle using observation of linear features such as roads, railroads, rivers or the like. Maps of linear features in several discrete areas along an intended flight path are prepared and entered into an on-board computer memory. The vehicle typically uses an inertial navigation system during flight from the origin to the first mapped area. Imaging sensors and on-board processing detect linear features as the vehicle approaches or passes over them.

U.S. Pat. No. 6,243,483 to Petrou et al. (PII North America, Inc.) issued Jun. 5, 2001 shows a mapping system for automated pipeline surveillance. Satellite data is integrated with the pipeline data to produce a current pipeline map. The current pipeline map is then compared with a previous pipeline map to determine whether the route of the pipeline or a surrounding environment of the pipeline has changed.

U.S. Pat. No. 6,766,226 to Andersen issued Jul. 20, 2004 (Andersen Aeronautical Technologies) shows a method of monitoring utility lines with an aircraft using a dual sensor camera capable of concurrently capturing both thermal images and real time video images.

U.S. Pat. No. 7,184,072 to Loewen et al. issued Feb. 27, 2007 shows a system and apparatus for acquiring images of electric transmission lines using a fixed wing aircraft and an arrangement of at least one still camera. A laser altimeter or a combination of preset longitude/latitude coordinates, and a GPS unit supply continuous longitude/latitude coordinates for the aircraft location for comparison to preset coordinates.

U.S. Pat. No. 5,894,323 to Kain et al. (TASC, Inc.) issued Apr. 13, 1999 shows an airborne imaging system using global positioning system (GPS) and inertial measurement unit (IMU) data. The IMU provides data representative of the attitude of the camera. The claims require an inertial measurement unit (IMU) and are not an infringement issue.

United States Patent Application 20070061076 to Shulman published Mar. 15, 2007 shows a survey for detecting a changed condition. Real-time geographic images are memorialized in conjunction with GPS coordinates, and are stored in ESRI shape file format. Later, when the same geographic space is traversed from a moving vehicle equipped with a GPS, the memorialized images are played back by coordinating the GPS data. An observer traveling within the moving vehicle can compare the memorialized images with those being traversed in order to identify changed conditions.

United States Patent Application 20050007450 to Hill et al. published Jan. 13, 2005 shows a power line survey using an aerial craft, such as a helicopter, to capture continuous visual, spatial (GPS), and related physical data, and a method for parsing the data to create a stream for analysis.

The foregoing references generally measure attitude of the aircraft and GPS coordinates, and on-board software calculates aiming data for controlling the digital camera based on the line of sight of the platform. The automatic aiming is done in accordance with the pre-defined position of the electric line, and the position of the helicopter based on GPS and attitude. However, there is no teaching about how the automatic aiming is done. Consequently, there remains a need for a system that computes the shortest vector between the aircraft position and the pipeline based on the aircraft GPS and the a geolocation database, and then commands a stabilized camera system to point directly at the pipeline regardless of the aircraft position and orientation, automatically collecting NTSC or digital video of the entire right of way.

SUMMARY OF THE INVENTION

Accordingly, it is an object of the present invention to provide an Airborne Autonomous Imager automatic video imaging system that improves linear right-of-way monitoring.

It is another object to improve pilot safety and efficiency by allowing the pilot to concentrate on flying as the system automatically images the right of way.

It is another object to provide a video record useful for right of way planning and regulatory conformance.

It is another object to provide high resolution views of the right of way to prevent loss of capacity and related liability.

In accordance with the foregoing and other objects, the present invention is an automated airborne video system to support pipeline right of way monitoring, or monitoring of other linear ground features such as electric lines. The Airborne Autonomous Imaging system comprises a gimbaled, stabilized camera system, a video recorder, and modular Autonomous Imaging software. One software module computes the closest coordinate point on the linear ground feature (pipeline right-of-way or otherwise) based on the aircraft GPS position relative to the Geographic Information Database. The other software module commands the stabilized camera system to point directly at the ground feature (pipeline) regardless of the aircraft position and orientation, and automatically collect continuous NTSC or digital video of the entire right of way.

BRIEF DESCRIPTION OF THE DRAWINGS

Other objects, features, and advantages of the present invention will become more apparent from the following detailed description of the preferred embodiments and certain modifications thereof when taken together with the accompanying drawings in which.

DETAILED DESCRIPTION OF THE PREFERRED EMBODIMENTS

The present invention is an autonomous imaging system for an aircraft adapted to automatically capture a video record of an extended linear ground feature, such as an oil pipeline or power line right-of-way, by computing the closest coordinate point on the linear ground feature (pipeline right-of-way or otherwise) based on the aircraft's 2D or 3D GPS coordinates relative to geolocation data for the ground feature. The system includes a stabilized servo-controlled camera system that points directly at the nearest point of the ground feature regardless of the aircraft position and orientation. The camera system automatically collects NTSC or digital video of the entire ground feature.

Figure 1:
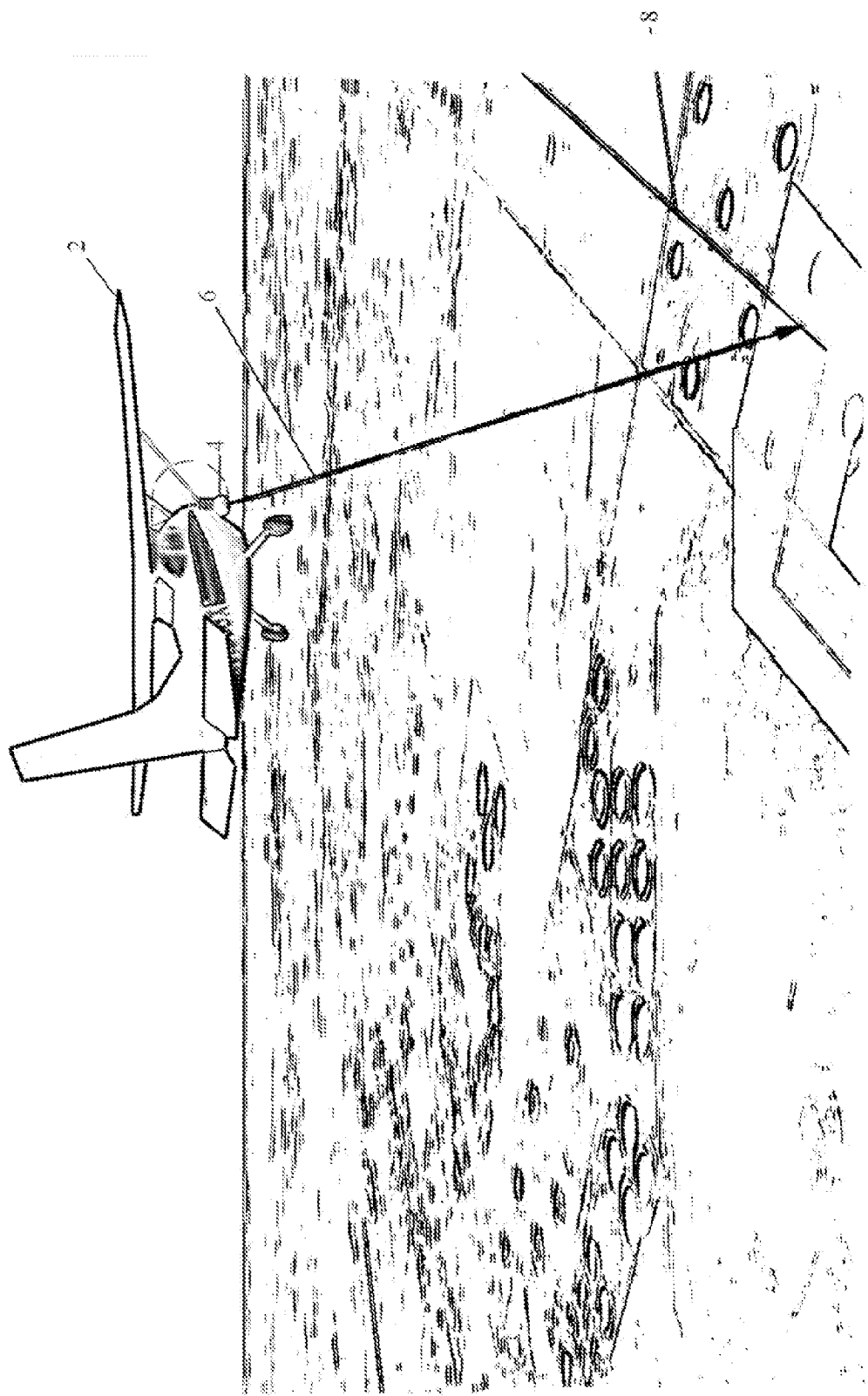
FIG. 1 is a perspective view of the Airborne Right of Way Autonomous Imaging system according to an exemplary embodiment of the present invention.

FIG. 1 is a perspective view of the Airborne Right of Way Autonomous Imaging system according to an exemplary embodiment of the present invention.

The Airborne Right of Way Autonomous Imaging (AiRWAI) system generally comprises a gimbaled, stabilized camera system 4 mounted in a downward-facing orientation as shown on any small-engine aircraft 2 including airplanes, UAVs or helicopters. The AiRWAI system also includes a processor (or computer), modular software, and a video recorder mounted in the aircraft 2 remotely from the camera system 4. The computer automatically points and controls the camera system 4 to capture a video record of an extended linear ground feature while the aircraft flies along it, such as an oil pipeline 8 (as shown). The video record is stored to the video recorder. The computer points the camera system 4 by computing the closest coordinate point on the linear ground feature based on the shortest vector 6 between the aircraft 2 position and the pipeline 8 based on 2D or 3D GPS coordinates of the aircraft relative to an object geolocation database for the ground feature. One software module performs the computation, and another points the camera system. The stabilized camera system is made to point directly at the pipeline regardless of the aircraft position and orientation, and to automatically collect analog (NTSC, PAL or SECAM) or digital video of the entire right of way. Optionally, frame-by-frame GPS data may be collected as well, and may be recorded separately or encoded into the video frames or audio track of the video signal for audit purposes. One skilled in the art should also understand that the camera system 4 may comprise one or more analog or digital video cameras for imaging visual, multispectral, hyperspectral and/or infrared video. If analog, the images may be NTSC, PAL or SECAM formatted. If digital, the images may be encoded in any of a variety of known formats (JPEG2000 or MPEG-1 ... 4, for example). The video and GPS metadata may also be recorded on a computer.

Figure 2:
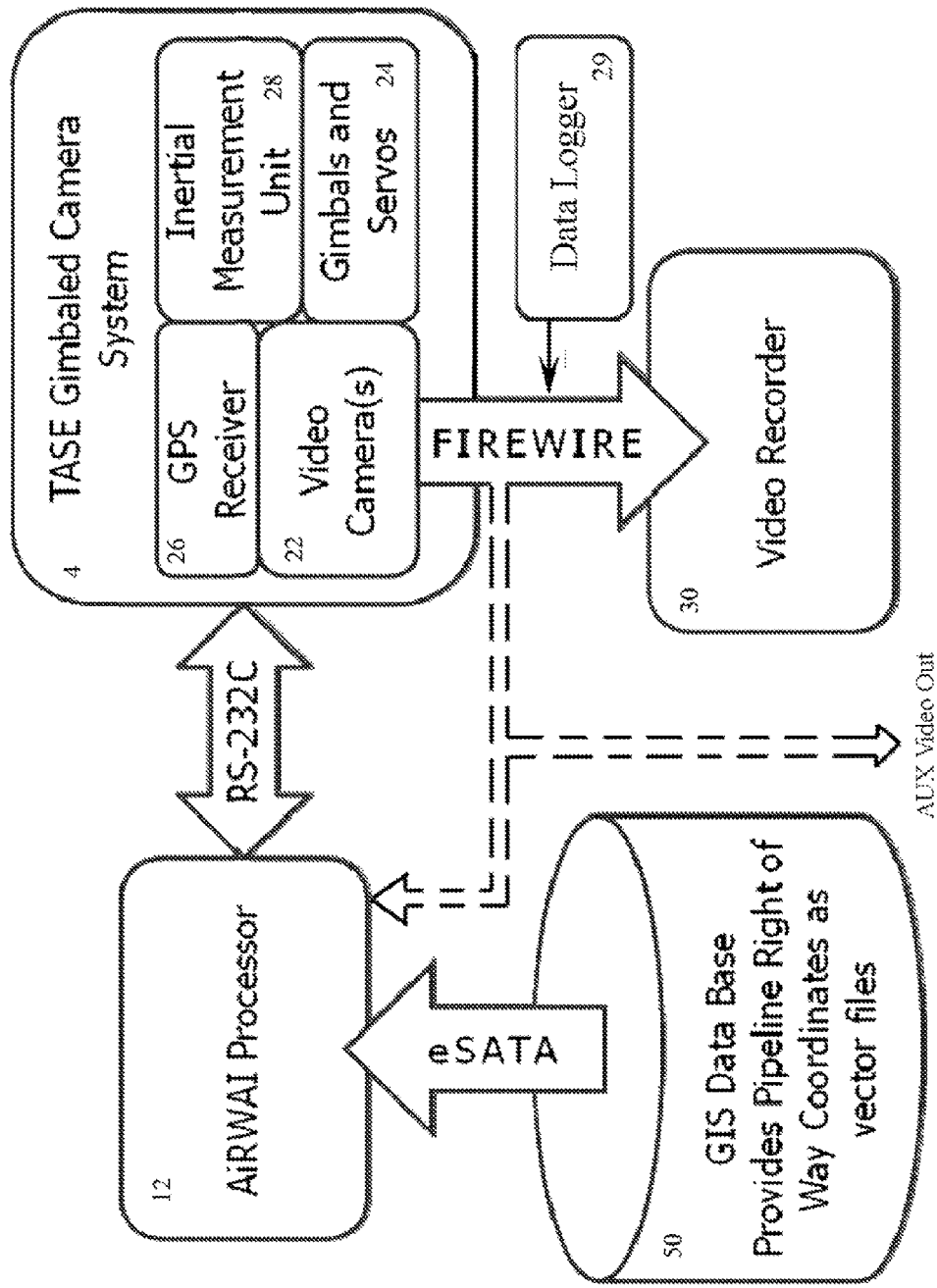
FIG. 2 is a block diagram of the Airborne Autonomous Imaging system as in FIG. 1.

FIG. 2 is a block diagram of the AiRWAI system as in FIG. 1. The system includes a Processor 12 which may be any conventional computer, preferably a portable laptop or the like running a Windows (XP, 2000, Vista, 7, etc.) operating system, and complete with conventional computer peripherals and at least one bi-directional communication port which, for example, may be a serial RS-232C port as shown. One skilled in the art will readily recognize that other types of processors such as programmable logic controllers or Apple® computers will suffice, and other operating systems such as Linux, Unix or Macintosh® will suffice.

The processor 12 is in bi-directional communication via RS-232C port to the gimbaled camera system 4. The gimbaled camera system 4 further comprises at least one video camera 22 mounted in a stabilized remotely-controlled gimbal mount. Both video camera 22 and gimbal mount 24 are connected via RS-232C port to Processor 12. The gimbal mount is preferably a servo-controlled inertially-stabilized gimbal mount with pan, tilt, and high-accuracy pointing resolution. A suitable commercially-available gimbal mount 24 is, for example, a TASE gimbal available from Cloud Cap Technology™, a Goodrich Company. The TASE Gimbal is a very small stabilized gimbal ideally suited for single camera tracking applications. It comes with a 25-Pin Micro-D connector, a GPS antenna input connector, and a video output connector, and the appropriate documentation and control interface software for enabling remote control. The TASE Gimbal allows continuous pan, +23°/−43° tilt, 40°/second slew rate, and 0.05° pointing resolution.

The Processor 12 controls the movement of the gyro stabilized gimbal mount (via provided gyros and servos 24), thereby pointing the camera 22 where desired at 0.05° pointing resolution. However, the Processor 12 needs to know where to point the camera. In this regard, an inertial measurement unit (IMU) 28 and GPS receiver 26 are provided on the gimbal mount 24. Both the inertial measurement unit 28 and GPS receiver 26 are likewise in bi-directional communication via RS-232C port to the Processor 12.

The video camera 22 in this exemplary embodiment is NTSC, and so is connected by a suitable NTSC video connection (or, if a digital video camera is used, a suitable digital video connection such as IEEE 1394 or FireWire, for example)) to a video recorder 30 to store the captured video. Alternatively, the video can be recorded back onto the Processor (laptop) 12 or a second computer (by Auxiliary Video Output), in each case with a semi-continuous record of camera coordinates and pointing angles derived from the GPS receiver 26 data and IMU 28 data for later use in geo-locating imagery, thereby providing enhanced utility in assessing right of way condition.

Appropriate wiring harnesses interconnect all the foregoing items.

The processor 12 maintains a semi-continuous chronological log of the aircraft position (from the GPS receiver 26) as well as the computed aim point of the camera. In simplest form this logged data is stored in processor 12 memory for later correlation to the time-stamped video frames, thereby allowing subsequent ground-based analysis. Additionally, the logged data may be encoded as visual text frame-by-frame directly onto the video recording, or may be encoded into the audio track. Optionally, a data logger 29 may be provided to maintain an independent, running record of aircraft speed and position for use in conjunction with the video record. In this regard, the data logger 29 may be an encoder such as a Red Hen™ VMS-100 or 300, adapted to encode GPS metadata into the video recording, such as into the audio track. The data logger 29 is likewise used for "geo-tagging" the recorded video. In all the foregoing instances the logged data, when later viewed or decoded, facilitates mapping of the aircraft position on a map relative to the right of way, and tracking of the relative speed, distance and direction that the camera was moving, at the same time that the video is played back.

In addition, the Processor 12 has access to a locally-stored GIS database 50 of the pipeline area, the database comprising at least one and optionally two separate records: 1) Environmental Systems Research Institute, Inc. (ESRI) Shape files of the linear characteristic of interest, plus optionally 2) a separate digital elevation model (DEM) of the linear characteristic of interest.

GIS database 50 is stored on the aircraft in the control computer or a solid-state drive (SSD), preferably using a rapid hard disk drive interface (such as eSATA).

The shapefiles store non-topological geometry and attribute information for spatial features in a data set. A linear feature is described as a polyline which comprises one or more segments, where each segment is an array of points. The geometry for each polyline defines a segmented linear shape comprising a set of vector coordinates. These are used to spatially describe geometries such as pipelines, power lines or other types of rights-of-way. Because shape files do not have the processing overhead of a topological data structure they have advantages over other data sources such as faster drawing speed and edit ability. Attributes are held in a dBASE® format file. ESRI Shapefiles were developed and are regulated by ESRI as an open specification for data interoperability among ESRI and other software products. Each shapefile further comprises a collection of files with ".shp", ".shx", ".dbf", and other extensions all named with a common ground feature name (e.g., "power line.*"). Thus, an ESRI shapefile for a pipeline will include a main file, an index file, and a dBASE table. The main file is a direct access, variable-record-length file in which each record describes the pipeline with a list of its vertices. In the index file, each record contains the offset of the corresponding main file record from the beginning of the main file. The dBASE table contains feature attributes with one record per feature.

The GIS database 50 of surface feature shapefiles used herein may be (optionally) supplemented with a Digital Elevation Model (DEM) for topology. DEM is the terminology adopted by the USGS to describe terrain elevation data sets in a digital raster form. The standard DEM consists of a regular array of elevations cast on a designated coordinate projection system. In this case the DEM is stored as binary ESRI™ GRID data. For example, a suitable DEM is available in Spatial Data Transfer Standard (SDTS) format from the USGS, representing elevation (meters) at 2D geolocation coordinates. This digital elevation model (DEM) data may be converted into ESRI™ GRID format using a commercially-available conversion utility, which then allows querying of the DEM data (using ArcGIS™ by ESRI™ or other geographic information system (GIS) software products) to ascertain elevation (meters) for any given 2D coordinates from the shapefiles.

The Processor 12 points and controls the camera system 4 to automatically capture a video record of an extended linear ground feature as the aircraft flies along, such as an oil pipeline 8 (as shown). The video is stored to a computer or video recorder 30. The Processor 12 points the camera system 4 by computing the shortest vector 6 between the aircraft 2 current position and the pipeline 8 based on 2D or 3D GPS coordinates from GPS receiver 26 and the combined ESRI Shape files and DEM elevation from GIS database 50. This way, the stabilized camera system points directly at the pipeline regardless of the aircraft position and orientation, and automatically collects NTSC or digital video of the entire right of way.

The Processor 12 runs software comprising two primary modules: an interface module for controlling the camera gimbals and servos 24, and a analysis module for taking the three dimensional GPS position coordinates of the aircraft in near real time, mining 2D or 3D data from the GIS database 50, and computing the closest coordinate point on the linear ground feature (pipeline right-of-way or otherwise). Note that the use of 3D geometry is not necessary in GIS database 50 for the analysis module, since the use of 2D data has been found to be of sufficient accuracy for the stated purpose, depending on the verticality of the terrain. Further, with 2D data the computation becomes much simpler, data overhead and storage requirements are reduced (since the ESRI shapefile need only contains 2D data), and a 2D GPS receiver 26 may be used. Nevertheless, 3D geometry improves accuracy and for this the ESRI shapefile in database 50 must contain 3D data or be supplemented with separate topological data, and a 3D GPS receiver 26 must be used.

By way of example, the interface software module is designated TASWIN and it is responsible for controlling the gimbal 24.

The analysis module is designated TASEGIS, and TASEGIS knows where the vehicle is (from GPS Unit 26 and IMU 28), looks into GIS database 50, finds the closest point, and sends 2D or 3D coordinates (X,Y and optionally Z) to TASEWIN using a standard socket-based IP communication protocol.

An example will now be described to illustrate the stepwise operation of the present invention. The analysis module 56 TASEGIS comprises a C# program adapted to obtain real-time 3D GPS data from GPS receiver 26 and, with reference to the GIS database 50, compute the point on the selected pipeline (or other linear ground feature) that is closest to the aircraft's current position. TASEGIS then sends the (X,Y and optional Z) coordinates of that point to the TASEWIN program running on processor 12, which commands the stabilized camera system 4 to point directly at the linear ground feature regardless of the aircraft position and orientation, automatically collecting continuous NTSC or digital video of the entire linear ground feature.

Though TASEGIS is currently written in C#, which uses the Microsoft™ .net framework effectively restricting the software to a Windows® platform, one skilled in the art will readily understand that the software can easily be ported to Java®, allowing the Swing® or other framework (for alternate operating platforms), or C++ with a variety of frameworks.

Figure 3:
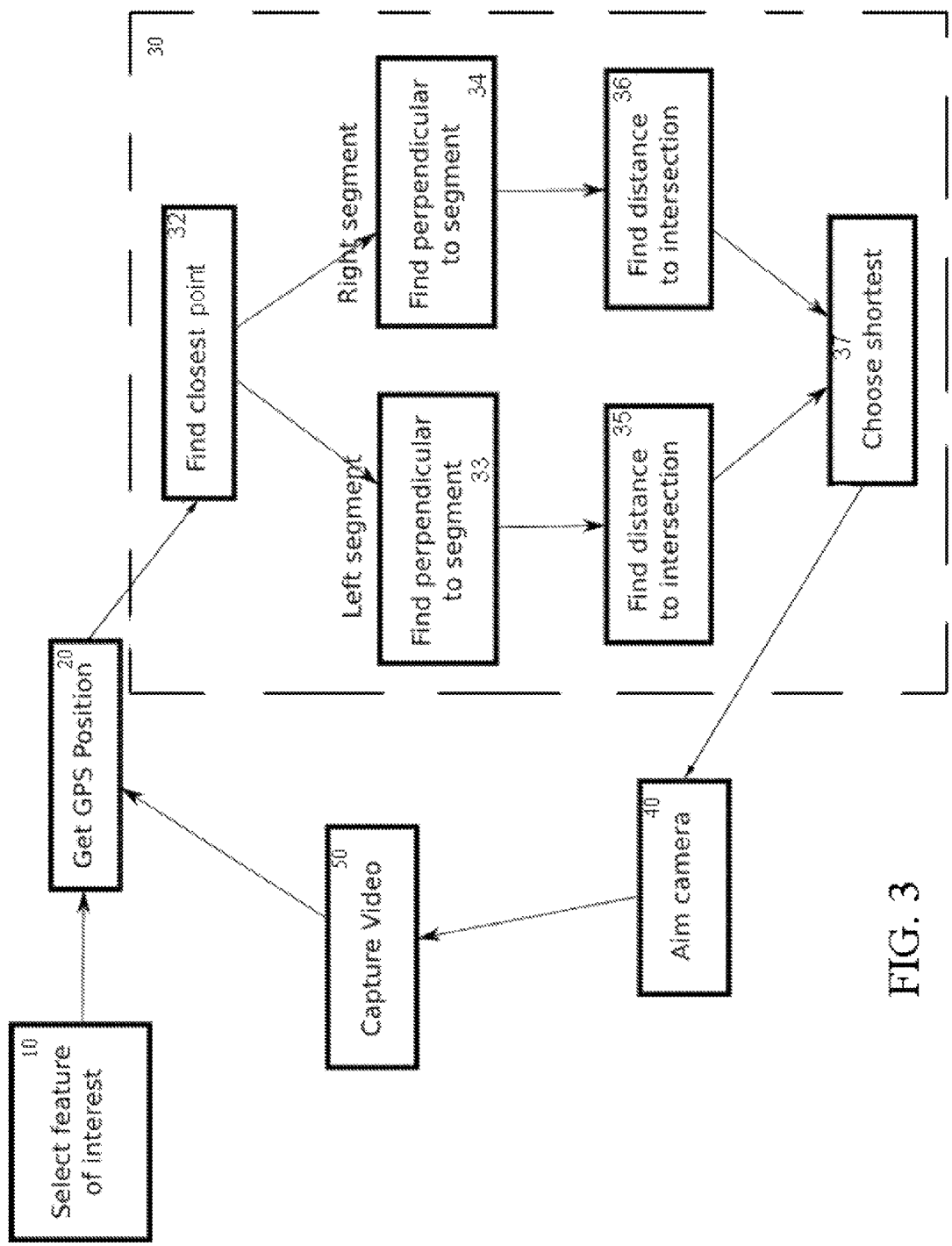
FIG. 3 is a flow chart of the method of the present invention.

FIG. 3 is a flow chart of the method of the present invention. At step 10, the linear ground feature of interest is selected. This can be accomplished using MapWindow GIS™ desktop, which is an open source, standards-based standalone software package for viewing and editing GIS data including ESRI shapefiles. The shapefile of interest is selected and uploaded to TASEGIS 54. One skilled in the art should understand that the present invention also contemplates a graphical user interface integral to TASEGIS 54 which would allow direct graphical selection of the ground feature from processor (laptop) 12 display and user-input.

At step 20, given selection of a ground feature of interest, the analysis module 56 TASEGIS begins to poll the GPS Receiver 26 and transmit three dimensional GPS position information at a rate of approximately ten hertz. The three dimensional GPS position information includes Altitude, Longitude and Latitude information in RAW format from the GPS 26 as follows: DMM M/D/Y H:M:S −8.00 hr where DMM means "Degrees-Minutes.point.Minutes", M/D/Y H:M:S is the timestamp from "year-to-second", −8.00 hrs is the time setback from GMT, plus latitude and longitude (the angular distance, in degrees, minutes, and seconds), and optionally elevation.

At step 30, the analysis module 56 TASEGIS compares the three dimensional GPS position information from step 20 with the GIS database 50 selected ground feature data, and computes the closest point on the selected linear ground feature (here pipeline 8) based on the aircraft three dimensional GPS position information and the ESRI shape file and DEM elevation data. Currently, the shortest path computation is implemented with assistance of an open-source MapWindow™ plugin running on processor 12. The MapWindow™ plugin has two functions: 1) to display the pipeline right-of-way within the context of other geographic features (street, highway and city shapes, etc.) on the processor 12 (laptop display) along with the location of the vehicle and the camera aim point; and 2) parsing of the pipeline shapefile to facilitate rapid and efficient computing the appropriate camera aim points.

The actual analysis module 56 computation of the appropriate camera aim point at each given point in time is iteratively accomplished using a shortest path function such as, for example, a modified Dijkstra function as set forth at Li et al., Geospatial Information Technology for Emergency Response The shortest path function is implemented through the MapWindow™ plugin. The plugin calls the function which computes the Euclidean distances from the GPS Receiver 26 to each point on the polyline representing the right-of-way, and selects the point closest to the GPS Receiver 26 location. One skilled in the art should understand that it is not necessary to use a MapWindow™ plugin for this, inasmuch as custom code can be written to iterate over the vertices on the polyline, compute the Euclidean distances, and choose the closest, but MapWindow™ provides a convenient means for implementing this functionality.

The computation is iterative, continually finding the closest point based on GPS 26 position. Specifically, given that the polyline shapefile for an extended linear ground feature of interest comprises one or more line segments, for each line segment the analysis module 56 TASEGIS analyzes the linear equation of each line segment, determines at substeps 33, 34 where a perpendicular line drawn from the GPS 26 to each linear equation would intersect each linear equation and what those points of intersection are. The analysis module 56 TASEGIS then calculates whether the point of intersection is within the line segment boundaries and, if so, at substeps 35, 36 calculates the Euclidean distance to that point on each line segment. This approach relies on the geometric truth that there is exactly one point of intersection of a line drawn from the aircraft to a line containing each line segment on the ground that is shortest, albeit that that point may not be within the associated line segment. If a point of intersection is not within the corresponding line segment boundaries, that segment is not considered (unless it is an end segment as per below, in which case the aim point is taken to be the endpoint of the polyline). If multiple line segments qualify, the calculated Euclidean distances for those line segments are then compared to determine the shortest. At substep 37 the closer of the points of intersection (if the point is within the respective line segments) is chosen as the camera aim point.

The computation requires certain conditional logic. If the closest point is at either end of the segmented polyline, only the single segment connected to that point needs be considered. Otherwise, the closest point on both segments of a connected pair is determined, and then the closer of the two is selected as the camera aim point.

In this manner the Airborne Autonomous Imaging system iteratively calculates and selects a succession of camera aim points, continually changing with vehicle/aircraft position and speed, each representing the point on the linear ground feature that is closest to the camera's current location.

At step 40, given the computed camera aim point, the analysis module 56 TASEGIS interfaces to the TASEWIN module which controls the gimbaled camera system 4 and instructs the gimbals and servos 24 to point the camera 22 at that closest location, maintaining a ten hertz update rate.

At step 50, the resulting video stream is recorded on processor 12, a standalone computer, and/or video data recorder 30, and aircraft GPS position or other metadata may optionally be recorded by processor 12 or data logger 29.

The foregoing improves the process of monitoring of linear ground features in several ways:
- it improves pilot safety and efficiency by allowing the pilot to concentrate on flying;
- it provides a video record which is useful for linear ground feature planning and regulatory conformance;
- it provides high resolution views of the linear ground feature which may prevent loss of capacity and related liability; and
- it allows creation of an image database.

Therefore, having now fully set forth the preferred embodiment and certain modifications of the concept underlying the present invention, various other embodiments as well as certain variations and modifications of the embodiments herein shown and described will obviously occur to those skilled in the art upon becoming familiar with said underlying concept. It is to be understood, therefore, that the invention may be practiced otherwise than as specifically set forth in the appended claims.

What is claimed is:

1. An automated airborne video system to support right of way monitoring of a linear ground feature from an aircraft while said aircraft flies along said linear ground feature, comprising:
   a servo-controlled gyro-stabilized gimbal mount for a camera mounted to said aircraft;
   a video camera mounted on said gimbal mount;
   a computer in communication with both said video camera and said servo-controlled gimbal mount;
   a GPS unit connected to said computer for outputting said aircraft GPS coordinates thereto;

a video recorder connected to said video camera;
computer memory storing an object geolocation database including at least one ESRI shape file corresponding to said linear ground feature,
said ESRI shape file comprising a polyline including a plurality of line segments each represented by a linear vector function, said computer memory also storing software executable by said processor for iteratively calculating closest coordinate points of intersection of lines extending from said GPS receiver to each linear vector function of each of said plurality of line segments of each said polyline and determining Euclidean distance to said closest coordinate points of intersection, and then applying a Dijkstra shortest path function to calculate a selected one of said computed coordinate points of intersection along one of said polyline line segments that minimizes three-dimensional linear distance to the GPS receiver, and said computer memory also storing software executable by said processor for automatically aiming said video camera at each iteratively selected coordinate point in real time and capturing a video record of said extended linear ground feature.

2. The automated airborne video system according to claim 1, further comprising an inertial measurement unit (IMU) mounted to said aircraft and in data communication with said computer for measuring velocity and orientation and for transmitting the measured velocity and orientation to said computer.

3. The automated airborne video system according to claim 2, wherein said IMU is mounted on said gimbal mount for measuring velocity of said aircraft and combined orientation of said aircraft and gimbal mount and for transmitting the measured velocity and orientation to said computer.

4. The automated airborne video system according to claim 1, wherein said GPS receiver is mounted on said gimbal mount.

5. The automated airborne video system according to claim 1, wherein said GPS receiver is a three-dimensional GPS receiver.

6. The automated airborne video system according to claim 1, wherein said gimbal mount is mounted exteriorly of said aircraft and has remote-control pan and tilt pointing capability, said gimbal mount being in data communication with said computer for remote control pointing thereby.

7. The automated airborne video system according to claim 1, wherein said computer maintains a semi-continuous chronological log of aircraft position and computed aim points of the camera.

8. The automated airborne video system according to claim 7, wherein said computer encodes the logged aircraft position and computed aim points of the camera directly onto corresponding image frames of said video record.

9. A system for capturing a video record of an extended linear ground feature from an aircraft while said aircraft flies along it, comprising:
a processor in said aircraft and including memory for storing and executing software and a database;
an inertial measurement unit (IMU) mounted to said aircraft and in data communication with said processor for measuring velocity and orientation of said aircraft and for transmitting the measured velocity and orientation to said processor;
a GPS receiver mounted to said aircraft and in data communication with said processor for measuring GPS coordinates of said aircraft;
a camera gimbal mounted exteriorly of said aircraft having remote-control pan and tilt pointing capability, said camera gimbal being in data communication with said processor for remote pointing thereby;
at least one video camera mounted on said camera gimbal;
computer memory storing an object geolocation database including at least one ESRI shape file corresponding to said linear ground feature, said ESRI shape file comprising a polyline including a plurality of line segments each represented by a linear vector function, said computer memory also storing software executable by said processor for iteratively calculating closest coordinate points of intersection of lines extending from said GPS receiver to each linear vector function of each of said plurality of line segments of each said polyline and determining Euclidean distance to said closest coordinate points of intersection, and then applying a Dijkstra shortest path function to calculate a selected one of said computed coordinate points of intersection along one of said polyline line segments that minimizes three-dimensional linear distance to the GPS receiver, and said computer memory also storing software executable by said processor for automatically aiming said video camera at each iteratively selected coordinate point in real time and capturing a video record of said extended linear ground feature.

10. The system for capturing a video record according to claim 9, wherein said object geolocation database includes a plurality of ESRI shape files corresponding to a plurality of linear ground features.

11. The system for capturing a video record according to claim 10, wherein said analysis module computes a closest coordinate point along said extended linear ground feature to said aircraft based on the GPS coordinates from said GPS receiver relative to the ESRI shape file of said object geolocation database.

12. The system for capturing a video record according to claim 9, further comprising a video recorder connected to said video camera.

13. The system for capturing a video record according to claim 9, wherein said IMU is mounted on said camera gimbal.

14. The system for capturing a video record according to claim 9, wherein said GPS receiver is mounted on said camera gimbal.

15. The system for capturing a video record according to claim 14, wherein said GPS receiver measures three-dimensional GPS coordinates.

16. The system for capturing a video record according to claim 9, wherein said processor records a semi-continuous chronological log of aircraft position and computed aim points of the camera.

17. The system for capturing a video record according to claim 16, wherein said processor encodes the logged aircraft position and computed aim points of the camera directly onto corresponding image frames of said video record.

18. The system for capturing a video record according to claim 16, wherein said processor encodes the logged aircraft position and computed aim points of the camera directly into an audio track of the video record.

19. The system for capturing a video record according to claim 9, wherein said camera gimbal is a servo-controlled inertially-stabilized gimbal mount with pan and tilt pointing.

* * * * *